United States Patent [19]

Nielsen et al.

[11] Patent Number: 5,672,100
[45] Date of Patent: Sep. 30, 1997

[54] METHOD FOR SUSPENDING LIVE POULTRY BY THE LEGS AND AN APPARATUS, CATCHING MEANS AND SLAUGHTER SHACKLE FOR CARRYING OUT THE METHOD

[75] Inventors: Holger Hjort Nielsen, Kirke Hyllinge; Torben Brandt Sørensen, Ullerslev; Ole Brødsgaard, Svendborg; Verner Trygved Jensen, Herlev; Arne Knudsen, Stenstrup, all of Denmark

[73] Assignee: Poutech A/S, Denmark

[21] Appl. No.: 530,257

[22] PCT Filed: Feb. 28, 1994

[86] PCT No.: PCT/DK94/00083
§ 371 Date: Aug. 31, 1995
§ 102(e) Date: Aug. 31, 1995

[87] PCT Pub. No.: WO94/19957
PCT Pub. Date: Sep. 15, 1994

[30] Foreign Application Priority Data

Mar. 1, 1993 [DK] Denmark .................. 0224/93

[51] Int. Cl.[6] .................. A22C 21/00
[52] U.S. Cl. .................. 452/188; 452/179; 452/182
[58] Field of Search .................. 452/188, 178, 452/179, 182, 183

[56] References Cited

U.S. PATENT DOCUMENTS

| | | |
|---|---|---|
| 3,571,844 | 3/1971 | Stiles .................. 452/188 |
| 3,741,417 | 6/1973 | Blankenship . |
| 4,212,410 | 7/1980 | Galer .................. 220/324 |
| 4,272,863 | 6/1981 | Parker, Jr. .................. 452/188 |
| 4,380,969 | 4/1983 | Thomas . |
| 4,658,476 | 4/1987 | van den Brink . |
| 4,856,144 | 8/1989 | de Greef .................. 452/183 |
| 5,088,959 | 2/1992 | Heemskerk .................. 452/183 |
| 5,108,345 | 4/1992 | Harben, III et al. .................. 452/188 |
| 5,129,857 | 7/1992 | Keiter et al. .................. 452/179 |
| 5,290,187 | 3/1994 | Meyn .................. 452/178 |
| 5,370,574 | 12/1994 | Meyn .................. 452/178 |
| 5,514,033 | 5/1996 | Berry .................. 452/182 |

FOREIGN PATENT DOCUMENTS 0 355 037  2/1990  European Pat. Off. .
WO92/20223  11/1992  WIPO .

*Primary Examiner*—Willis Little
*Attorney, Agent, or Firm*—Bacon & Thomas

[57] ABSTRACT

Live poultry is caused to face in a desired direction prior to engagement of the poultry legs by a leg catching device by dropping the poultry one-by-one off the terminal end of a moving conveyor onto a lower conveyor having poultry leg engaging devices associated therewith. The poultry leg catching devices engage the poultry legs and the poultry are then inverted as they are conveyed to slaughter shackles. A slaughter shackle is configured to receive sets of poultry legs from the leg catching devices in a continuous process. The poultry is delivered to the first conveyor from poultry transportation boxes that are inverted along a horizontal axis to vertically drop the poultry onto a delivery conveyor system from which the poultry are delivered one-by-one to the first conveyor.

20 Claims, 3 Drawing Sheets

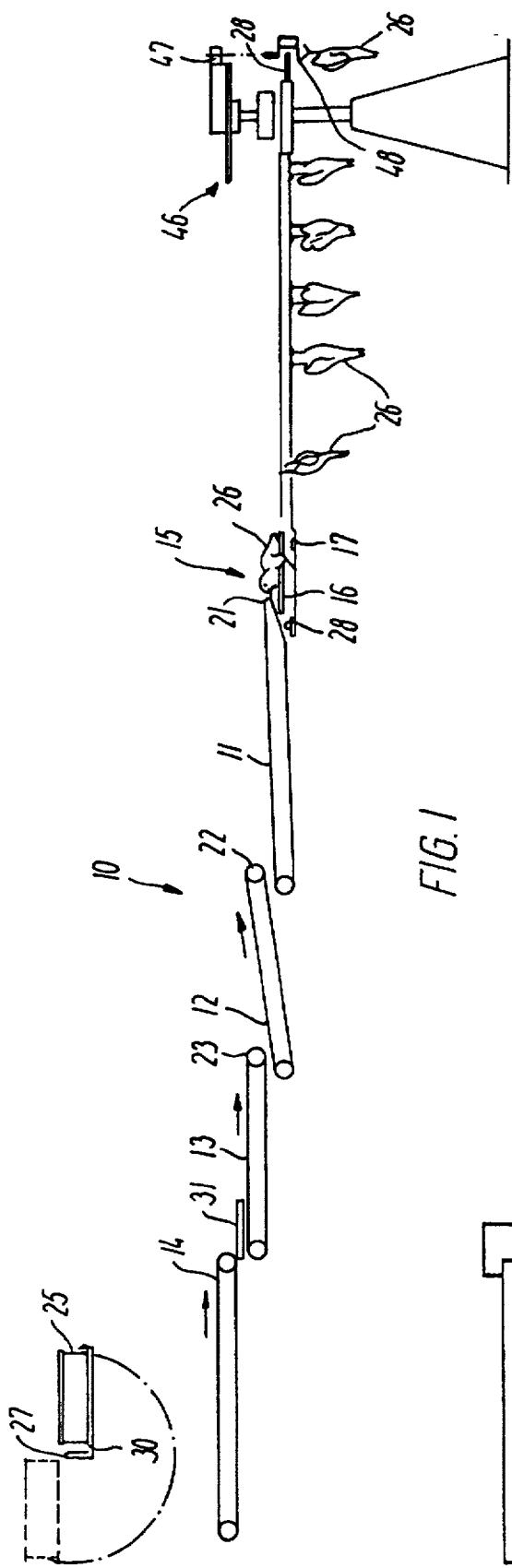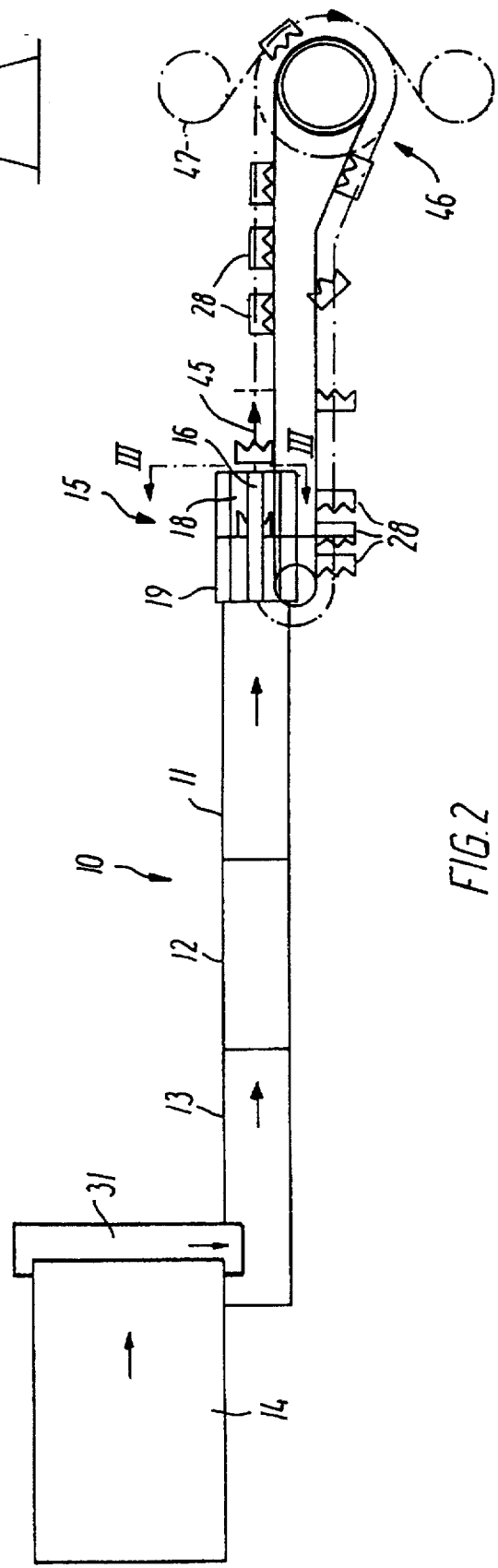

METHOD FOR SUSPENDING LIVE POULTRY BY THE LEGS AND AN APPARATUS, CATCHING MEANS AND SLAUGHTER SHACKLE FOR CARRYING OUT THE METHOD

BACKGROUND OF THE INVENTION (a) Field of the Invention

A method for suspending live poultry by the legs and an apparatus, catching means and slaughter shackle for carrying out the method.

(b) Discussion of Related Technology

The invention relates to a method of suspending live poultry, in particular chickens, by their legs, whereby the poultry is placed on a running conveyor. Such a method is disclosed in WO 92/20233.

The invention further relates to an apparatus and a slaughter shackle for use in carrying out the method according to the invention.

In the slaughtering of chickens these are generally delivered from the producer to the slaughterhouse in transportation boxes of a length and width so that they can be handled and a height corresponding to the height of a chicken. The chickens are placed close together in the box in one layer. In the slaughterhouse the live chickens are suspended by their legs in so-called slaughter shackles suspended on a conveyor chain. By means of the conveyor chain the chickens are passed round in the slaughterhouse where they are killed, defeathered, cleaned etc. The suspension of the live chickens is today frequently effected manually which is a monotonous and fatiguing work.

Several devices for automatic suspension of chickens are known. Thus, U.S. Pat. No. 4,658,476 deals with an apparatus intended to ensure that chickens are correctly suspended in the slaughter shackles, i.e. the abdomen being directed in a determined direction. The apparatus includes a slide along which the chickens slide individually from a rotary table to a conveyor belt. Said reference states that the chickens drop a little from the slide to the conveyor belt, which makes them stretch the legs so that they stand on the belt. The belt passes the chickens to a rail device which spreads their legs and the chickens are conveyed further forward to a catching means, catching and fastening the legs. The inventors of the present invention, however, have found that the chickens delivered to the slaughterhouse are frequently inclined to set immediately after they have been placed on a support. With such chickens the apparatus according to the US-reference will not be able to operate as intended. Moreover, there are no means for safely orienting the chickens correctly on the conveyor belt.

EP-A-0 355 037 describes a manner in which chickens are made to stand up and an apparatus for carrying out the method. According to the EP-reference the chickens are conveyed on a conveyor belt across a nozzle which sprays e.g. water on the abdomen of the chicken which makes them get up, so that it is possible to grip their legs by means of catching shackles. Said EP-reference, however, does not say anything about how to ensure that the chickens assume a correct position for catching.

According to WO-A-92 20 223 the poultry are orientated by means of a device comprising two side-by-side flexible-fingered rotors. The station is placed underneath the conveyor and the poultry is passed through the conveyor, which is longitudinally divided in two.

BRIEF SUMMARY OF THE INVENTION

The object of the invention is to provide a method and an apparatus for suspending live poultry, in particular chickens, by their legs, ensuring that the chickens, in a manner gentle to them may be brought from a standing or sitting position on a conveyor belt to a position suspended in slaughter shackles by their legs, and whereby the poultry is caused to face in a certain direction, this being an advantage for automated further processing of the poultry.

The object is fulfilled by means of a method of suspending live poultry, in particular chickens, by their legs, whereby the poultry is placed on a running conveyor, characterized in that the poultry is passed one by one over the downstream end of the conveyor and dropped down onto a place from where it is conveyed onward.

The inventors have found that a chicken, when passed over the end of a conveyor, e.g. a belt conveyor, will attempt to remain on the conveyor and in doing so, it turns to have its tail facing towards the conveying direction. By running the conveyor at a suitable speed the chicken will, in spite of its attempt to remain on the conveyor, be passed over the end of the conveyor and drop down.

According to the invention, the apparatus comprises a running conveyor with a downstream terminal end, a receiving station arranged below said downstream end to receive a piece of poultry, in which station a supporting means is provided for the abdomen of the poultry, said supporting means extending substantially horizontally in the longitudinal conveying direction of the conveyor and substantially centrally in relation to the longitudinal center plane of the conveyor, and means arranged below the supporting means for catching the legs of a piece of poultry and conveying it on, characterized in that the receiving station is arranged downstream of the downstream end of the conveyor to receive a piece of poultry passed over said downstream end. With this apparatus and its arrangement of the supporting means, a chicken will land with its abdomen against the supporting means with the legs suspended downwards on either side of the supporting means to enable catching of the legs by means of the catching device.

In one embodiment of the apparatus, lateral guide plates are provided at the downstream end of the conveyor to form a funnel with a discharge opening corresponding in size to the width of a piece of poultry and placed substantially centrally in relation to said supporting means. It is thereby ensured to a higher degree that the chickens actually land having a leg on either side of the supporting means.

In a further embodiment of the apparatus there is provided beneath the supporting means a treading surface or table for the poultry. The position of the chicken's feet is thereby farther ensured when the chicken is in the station to be gripped round the legs.

In a further embodiment the means for catching the legs of a piece of poultry includes a catching means adapted to be passed towards the legs of the poultry from the front or from the side when the poultry is in the intended position in the station. This is advantageous, because the inventors, having experimented, discovered that a chicken scarcely reacts if legs are touched from the front or from the side. It is thus possible with this embodiment to grip the legs of the chicken with a relatively quiet movement.

In an apparatus for use in carrying out the method according to the invention, a conveyor is divided into a plurality of subconveyors with the downstream end of an upstream subconveyor located above the upstream end area of a following subconveyor. As previously mentioned, the chickens are inclined to rotate in an attempt to remain on the conveyor when passed over the downstream end of a conveyor. However, the chickens may be passed several times over a conveyor end to thereby more safety ensure that all chickens have rotated correctly upon reaching a collection or receiving station.

According to an embodiment of the method according to the invention, the poultry is delivered to the conveyor from an open transportation box containing poultry that is suspended above a surface following which the transportation box is swung away beneath the poultry about a substantially horizontal axis, whereby the poultry drops down on the surface, following which the poultry is passed from the surface to the conveyor, or the surface constitutes part of a delivery conveyor.

An apparatus for carrying out this embodiment of the method includes a carrying device for a transportation box with a substantially horizontal axis of rotation, and a releasable retaining device for holding a transportation box supported by the carrying device for pivoting the transportation box downwards about the axis of rotation. In a further embodiment the apparatus includes a running delivery conveyor beneath the carrying device. The downstream terminal end of said delivery conveyor is positioned above a following conveyor at an upstream end thereof, and in relation to each other the two conveyors are relatively wide and relatively narrow, respectively, relative to the conveying direction. With this embodiment of the apparatus according to the invention, the chickens may be passed from a transportation box as a group on to a wide surface and from there further delivered one by one to a narrow conveyor surface so that they may be advanced in single file on the narrow surface centrally in relation to the receiving station in which they are later on placed to be caught by the legs and suspended.

A leg catching means for use in carrying out the method according to the invention comprises a flat portion with two lateral inwardly converging openings each associated with a bottom part with substantially parallel lateral edges and a bottom edge, the one lateral edge and/or the bottom edge of each bottom part being releasable so as to be movable after release away from the other edges, with said flat portion being pivotable about a substantially horizontal axis. With such a catching means, a chicken may be caught by the legs by preferably passing the flat portion from the front towards the legs of the chicken, so that each leg is passed into its respective opening and towards the bottom edge. When the bottom edge reaches the legs of the chicken, the legs are thus caught and the further movement of the flat portion moves the legs and the chicken away from the supporting means and the collection station. Then, the flat portion together with the chicken may rotate about the horizontal axis so that the chicken will be suspended with the head downwards. Thereafter the chicken may together with the catching means be passed to a desired position and be let off by releasing one lateral edge or the bottom edge of the bottom part.

A slaughter shackle for use in carrying out the method includes an upper portion adapted to be suspended, for instance in a conveyor or chain, and a lower portion having two vertical upwardly opening and downwardly closed slots. The part of the slaughter shackle which includes the upwardly opening slots is offset outwardly in the conveying direction from a transverse plane of the slaughter shackle that includes the upper portion that is vertical in use. Such a design of the slaughter shackle makes it possible to pass a catching means with a downwardly suspended chicken over that part of the slaughter shackle which includes the slots, whereby the chicken, upon release of the catching means, will slide down into the slots by its legs and be firmly held by the feet.

BRIEF DESCRIPTION OF THE DRAWINGS

The invention will now be explained in detail by means of examples with reference to the schematic drawings, in which:

FIG. 1 shows the apparatus according to the invention, comprising a subdivided first conveyor, FIG. 2 is a view corresponding to FIG. 1, but viewed from above.

DETAILED DESCRIPTION OF THE PREFERRED EMBODIMENTS

Figure 3:
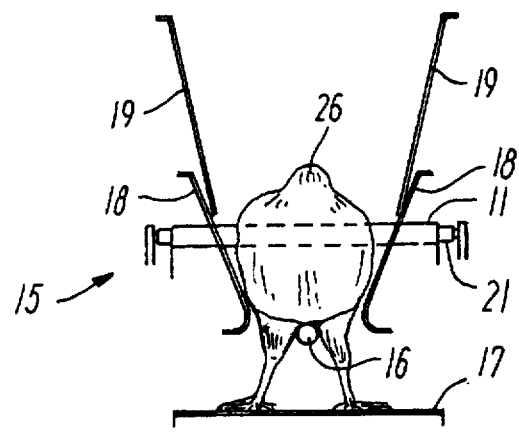
FIG. 3 is a section along the line III—III in FIG. 2.

FIGS. 1 and 2 show an apparatus comprising a first conveyor 10, divided into three subconveyors 11, 12 and 13. In the illustrated example said subconveyors are all belt conveyors and their longitudinal direction of conveyance is from the left to the right, viewed in FIGS. 1 and 2. At the downstream terminal end of the subconveyor 11 there is provided a collection or receiving station 15 with a supporting means which in the example is constituted by a stick or rod 16 extending substantially horizontally in the longitudinal direction centrally of the first conveyor in relation thereto and at a distance below the level of the terminal end of subconveyor 11. The collection station 15, moreover includes a table 17 and lateral guide plates 18 and 19 which for the sake of clearness are not shown in FIG. 1.

The belts of the subconveyors 11, 12 and 13 are passed over rolls, of which rolls 21, 22, 23 at the downstream ends of subconveyors 11, 12 and 13, respectively, have diameters D1, D2 and D3. As it appears from FIG. 1 the subconveyors 11, 12, 13 overlap each other so that an object advanced on the subconveyor 13 from an upstream location will be passed over the end at the roll at its downstream end and fall down onto the following subconveyor 12. Likewise, the transitions from the subconveyor 12 to the subconveyor 11, and from the delivery conveyor 14 to the subconveyor 13 include the same arrangement.

To the left in FIGS. 1 and 2 a delivery or receiver conveyor 14 is provided with larger width relative to the conveying direction than the first conveyor 10. A transportation box 25 placed in a suspension 30 with a horizontal axis of rotation 27 is shown in FIG. 1 above the delivery conveyor 14. Chickens arriving from a producer in the transportation box 25 are, in the illustrated example, transferred to the delivery conveyor 14 by rotating the transportation box with the device 30 about the axis 27 to the position shown in dashed lines. The rotation is effected quickly by means of a means not shown, so that the chickens substantially free fall down onto the receiver conveyor 14.

From the conveyor 14 the chickens are passed on to an intermediate conveyor 31 forming part of the delivery conveyor system and extending below the downstream edge of the conveyor 14 so that the chickens placed as a herd on the conveyor 14 are, by means of the intermediate conveyor 31, passed individually one by one to the upstream area of the first conveyor 10. The downstream terminal end of the intermediate conveyor 31 is positioned above the upstream end of the subconveyor 13 of the first conveyor 10.

When a chicken is passed from one conveyor to another lower conveyor and thus drops down a little, as is the case with the present apparatus, it will, when passing over the end of the higher conveyor, try to remain on the higher conveyor. In its attempt, it will turn its bill facing away from the direction of conveyance. It is this effect which, according to the invention, is utilized to make the conveyed chickens turn to face a determined direction (i.e., upstream of the conveyor). When the chickens from the delivery conveyor 14 fall down onto the intermediate conveyor 31, whether or not they have had time to ram, they will sense the transverse movement of the intermediate conveyor, that is transverse in relation to the delivery conveyor 14, and they will probably attempt to counteract this movement and thereby turn round, their bill directed opposite to the direction of transportation of the intermediate conveyor. This will be repeated at the transition from the intermediate conveyor 31 to the subconveyor 13.

It is the experience of the inventors that the chickens, after they have landed on a conveyor, will quickly sit down. It varies from breed to breed and from chicken to chicken how quickly the chickens sit down.

The transition from the subconveyor 13 to the subconveyor 11 will make the chickens which do not already face with their tails in the direction of conveyance turn to do so.

It has turned out that there is some connection between the speed of the belts of the subconveyors 11, 12, 13, the diameters of the rolls 21, 22, 23 and the temper of the breed of the chickens to be taken into consideration in order to obtain the desired and described effect. In successful experiments carried out by the inventors, a speed of 0.1–1 m/s with diameters D2 and D3 in the range of about 5 to 30 cm for the subconveyors 12 and 13 was used, whereas a speed of about 0.3–1.5 m/s and a diameter D1 in the range of about 3 to 20 cm was used for the subconveyor 11.

When the chickens arrive to the collection station 15, they will by guide plates 18 and 19 be passed to a position as shown in FIG. 3, showing a chicken standing with its bill facing the subconveyor 11, its legs straddling over the rod 16, and feet standing on the table or tread surface 17. The rod 16 prevents the chicken from sitting on the table 17 and the legs are therefore accessible to be gripped by means of a catching means.

Figure 4:
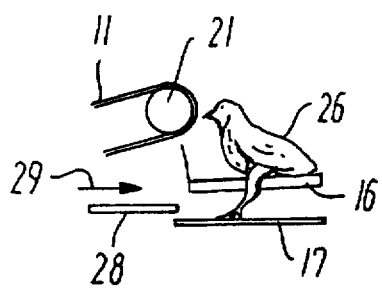
FIG. 4 is a side view of a chicken in FIG. 3.
Figure 5:
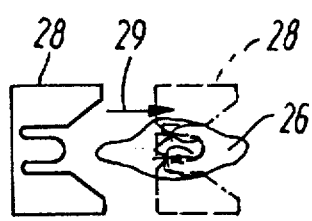
FIG. 5 is a view of a chicken in FIG. 4, viewed from below together with a catching shackle.

FIGS. 4 and 5 illustrate the same situation as FIG. 3, but from other angles, various parts being deleted for the sake of clearness. A catching means 28 only schematically shown in FIGS. 4 and 5 is moved from a position in front of the chicken backwards in relation thereto to the position shown in dashed line by the arrows 29 in FIG. 5, whereat the catching means 28 has gripped the legs of the chicken.

Figure 6:
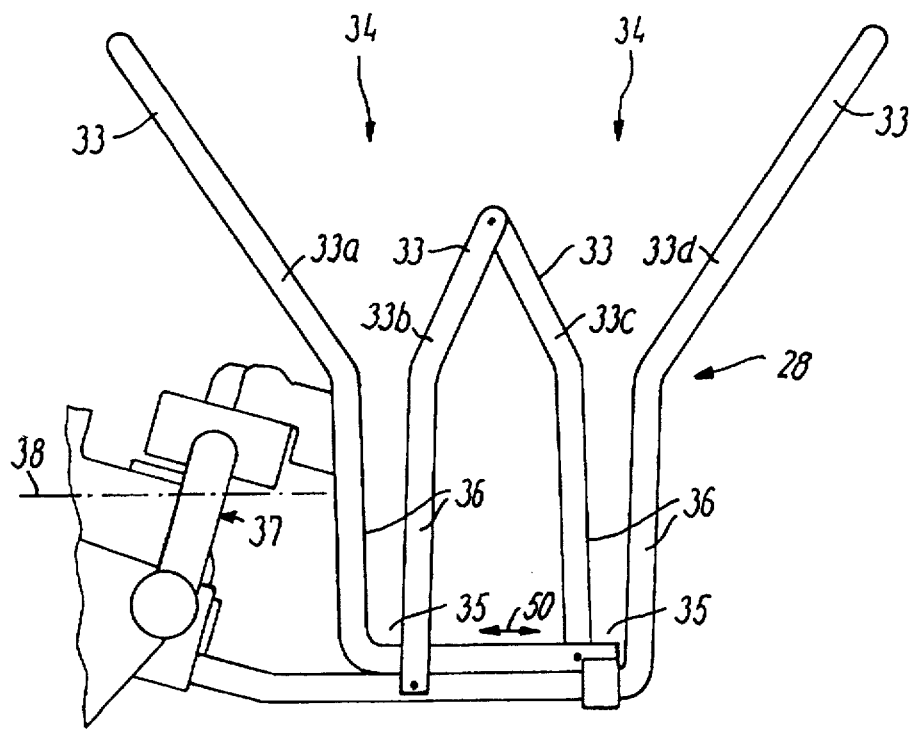
FIG. 6 is a sectional view of a catching means according to the invention, viewed from above.

FIG. 6 shows the catching means 28 viewed from above. The catching means 28 includes a generally flat shackle 33 with four branches 33a, 33b, 33c and 33d, which are substantially designed as a W or as two connected Y's.

The shackle 33 thus forms two openings 34 adjoining a bottom part 35. As it appears from the drawings, the parts 36 of the shackle 33 that define the bottom part 35 are substantially parallel and their mutual distance is determined so that they can grip between them and retain the legs of a chicken. In the illustrated example, the shackle is at one end suspended in a mechanism 37 with a horizontal axis of rotation 38. The branches of the shackle 33 are interconnected so that the branch 33a is hinged to the branch 33c and the branch 33b is hinged to the branch 33d and the branch 33c, respectively. Moreover, the branch 33a at the bottom part 35 may slide in relation to the branch 33d, as shown by the double arrow 50, and the mechanism 37 is arranged to control this sliding.

It will be recognized that sliding away of the branch 33a from the branch 33d will cause the distance between the parts 36 to the right and the left side, respectively, of the W to increase and vice versa.

Figure 8:
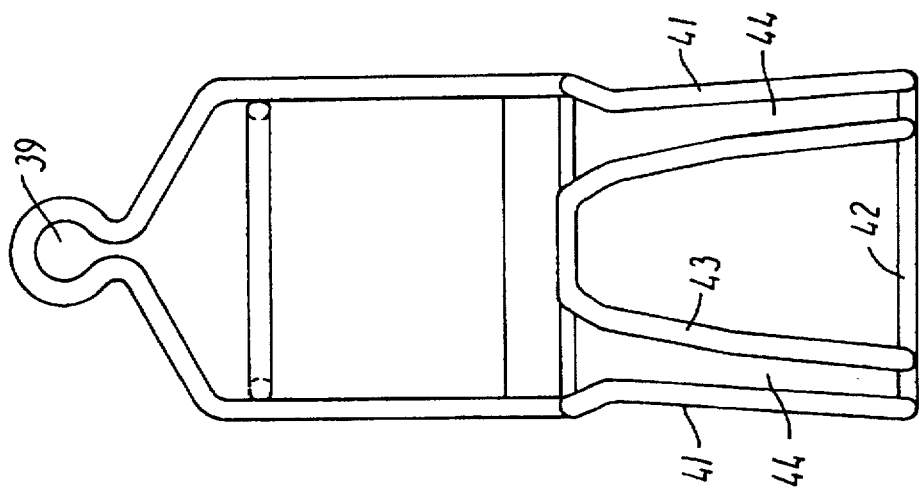
FIG. 8 illustrates the slaughter shackle according to the invention, viewed from the front.
Figure 7:
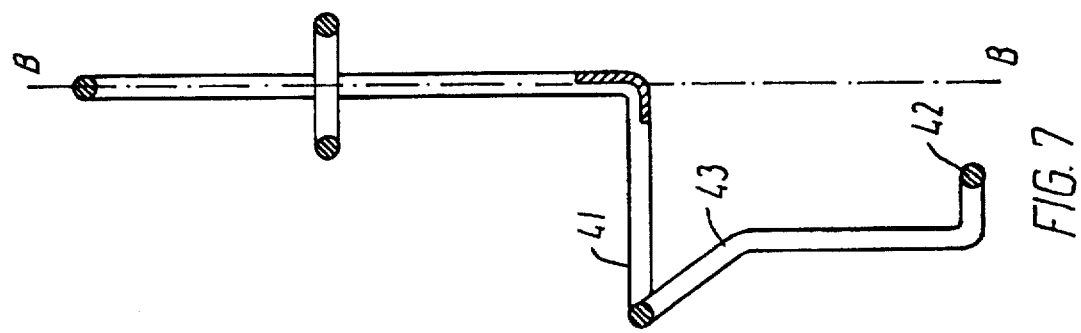
FIG. 7 is a slaughter shackle according to the invention, viewed from the side.

FIGS. 7 and 8 show a slaughter shackle 48 including a top portion with an eye 39 for suspension e.g. on a chain conveyor. The top portion is integral with a lower portion which, like the top portion, may be made from round steel, as is typical with slaughter shackles. The lower portion includes two side members 41 which extend a distance substantially perpendicularly from the general vertical plane BB of the slaughter shackle that includes the top portion in the conveying direction and after a bend extend downwardly towards a bottom member 42 at a location offset from plane BB. An intermediate member 43, as seen in FIG. 7, extends in the same offset location as the side members 41 and which, as shown in FIG. 8, has an inverted U-shape and is fixed on the bottom member 42 between the side members 41, in order to form together with the side members 41 two slots 44 of such a width that they can each receive and retain the leg of a chicken, as is known from current slaughter shackles.

The catching means and the slaughter shackle according to the invention are used as shown to the right in FIGS. 1 and 2. The catching means 28 are advanced in a path as shown by the arrow 45 so as to successively catch a chicken in the collection station as described with reference to FIGS. 3 to 5. After a chicken has been caught by its legs, the catching means 28 is moved further, and in drawing the chicken out of the collection station 15, the chicken falls forwards, the catching means 28 swings around its axis of rotation 38, and the chicken is made to be suspended with its head downwards. Then the catching means and the chicken are rotated so that the chicken is advanced sidewise. The catching means is passed further onto a wheel arrangement 46 where it joins a slaughter shackle suspended in a chain conveyor 47. The catching means 28 is thereby held in over the horizontal upper part of the side members 41 of the slaughter shackle. The chicken will thus hang in the catching means 28 having its legs extending through the slots 44 of the slaughter shackle 48. At this moment the branches 33a and 33d of the catching means 28 are allowed to slide from each other and the chicken is thus released from the catching means 28 and falls a little, its feet being caught by the slots 44 in slaughter shackle 48. The chicken is then fully transferred to the slaughter shackle.

We claim:

1. A method of suspending live poultry by their legs comprising:

placing the poultry individually one-by-one on a first running conveyor device having a downstream terminal end and running in a longitudinal conveying direction to move the poultry individually one-by-one in the longitudinal conveying direction in standing or sitting positions with the feet of the poultry on the conveyor device;

conveying the poultry to the downstream terminal end of the first conveyor device and dropping the poultry over said terminal end towards a lower position;

providing at least a second running conveyor device having an upstream area running in a longitudinal conveying direction located at least in part at said lower position, and conveying the poultry dropped towards said second conveyor device in the conveying direction of the second conveyor device; and incidental to said last conveying step, catching the legs of individual dropped poultry by a mechanical catching device and suspending the poultry by their legs in an inverted position by said catching device while conveying the poultry onwards away from the first conveyor device.

2. The method according to claim 1, wherein said longitudinal conveying directions of said first and second conveyor devices extend substantially in the same direction.

3. A method according to claim 1, wherein said first conveyor device comprises a plurality of subconveyors in series, each subconveyor having a downstream terminal end and an upstream area, and wherein the downstream terminal end of each subconveyor is located vertically above the upstream area of a following subconveyor of the series, including the step of placing poultry one-by-one on the first subconveyor of the series and conveying them towards the downstream terminal end of the first subconveyor; dropping conveyed poultry one-by-one from the higher downstream terminal end of the first subconveyor to the lower upstream area of the following subconveyor; continuing the conveying and dropping steps for each poultry up to a downstream terminal end of a last subconveyor in the series; and then carrying out the dropping of the poultry towards said second conveyor device.

4. The method according to claim 1, including guiding the poultry from the downstream terminal end of the first conveyor device to a poultry abdomen support associated with the second conveyor device by a funnel device having a discharge opening corresponding in size to the width of an individual poultry, said funnel device being centrally located relative to the poultry abdomen support; and carrying out said catching step while the poultry are supported at least in part at their abdomens by said poultry support.

5. The method according to claim 1, including guiding the poultry from the downstream terminal end of the first conveying device to a lower receiving station associated with the second conveyor device; supporting the poultry on their abdomens by a poultry support at said receiving station with the legs of the poultry disposed below the support; carrying out said catching step at said receiving station by engaging the poultry legs below the support with moving leg catching devices associated with said second conveyor device.

6. The method according to claim 5, including providing slaughter shackles for engaging and supporting the poultry legs and moving the poultry legs directly onto the slaughter shackles by said moving catching devices.

7. The method according to claim 1, including delivering the poultry to said first conveying device by transporting the poultry to a position above a surface using an upwardly open transportation box; inverting the box about a horizontal axis to cause the poultry to drop as a group vertically onto said surface; and then moving said poultry one-by-one onto an upstream area of said first conveying device from said surface.

8. The method according to claim 7, including using at least one moving delivery conveying system to provide said surface and to move the poultry onto the first conveyor device.

9. The method according to claim 8, including providing as part of the delivery conveying system, a moving conveyor surface for receiving the dropped poultry that is wider than the width of said first conveyor device, an intermediate conveyor at a downstream and lower location relative to the wider conveyor surface and at an upstream location and higher relative to said first conveyor device;.

moving the poultry from the wider conveyor surface of the poultry delivery system onto the first conveyor device by means of the intermediate conveyor.

10. The method according to claim 9, including moving the poultry from the moving wider surface of the poultry delivery conveying system to the first conveyor device by moving the intermediate conveyor in a direction generally perpendicular to the direction of motion and direction of conveyance of the wider surface and the first conveyor device, respectively.

11. Apparatus for suspending live poultry comprising:

a first longitudinally extending conveyor device, said first conveyor having a downstream terminal end;

at least a second conveyor device having at least an upstream area located below the downstream terminal end of the first conveyor device;

a movable leg catching device arranged to be movable into engagement with the legs of individual conveyed poultry associated with said second conveyor device and located below the downstream terminal end of the first conveyor device;

whereby poultry conveyed one-by-one on said first conveyor device with the feet of the poultry on the conveyor surface may be dropped off the terminal downstream end thereof towards an upstream area of the second conveyor device to cause the poultry to orient themselves in a single preferred direction and whereby the legs of the poultry may be engaged by the mechanical leg catching device after the poultry have dropped below the downstream terminal end of the first conveyor device.

12. Apparatus according to claim 11, including a poultry receiver means located below said downstream terminal end of said first conveyor device; a poultry abdomen support associated with said receiving means; said leg catching device arranged to engage individual legs of poultry supported on the abdomen support below the poultry abdomen support; and means for guiding individual poultry dropped onto the poultry abdomen support from the downstream terminal end of the first conveyor device in an upright position with the poultry legs straddling the abdomen support.

13. Apparatus according to claim 12, wherein said abdomen support extends horizontally and substantially centrally relative to the vertical center plane of the first conveyor device.

14. Apparatus according to claim 13, wherein said means for guiding dropped poultry comprises lateral guide plates forming a funnel with a discharge opening corresponding in size to the width of an individual poultry, said discharge opening being aligned centrally above said poultry abdomen support.

15. Apparatus according to claim 14, including a tread plate for the dropped poultry located below the poultry abdomen support and below the path of motion of the leg catching device.

16. Apparatus according to claim 11, said first conveyor device comprising a plurality of subconveyors in series, each subconveyor having a downstream terminal end and an upstream area, said downstream terminal end of each subconveyor being located vertically above the upstream area of a following subconveyor of the series, whereby poultry conveyed by each subconveyor may be dropped from the terminal end thereof onto the upstream area of a following subconveyor.

17. Apparatus according to claim 11, said leg catching device including individual flat portions generally having side edges defining a pair of laterally inwardly converging openings and a bottom part extending between said side edges; means for adjusting the size of the openings; and means for supporting the flat portions for pivotal motion about a substantially horizontal axis.

18. Apparatus according to claim 17, wherein said means for adjusting the size of the openings includes means for moving at least some of the side edges relative to each other.

19. Apparatus according to claim 11, including a slaughter shackle for engaging, suspending and transporting in a conveying direction live poultry by their legs, said slaughter shackle including an upper, conveyor engaging portion lying generally in a first vertical plane during use; a lower portion defining a pair of upwardly opening and downwardly closed slots that are laterally spaced relative to a conveying direction, said slots offset from said first plane at a location downstream relative to the conveying direction;

said slaughter shackle being located beyond the poultry leg catching device, said leg catching device being movable towards the slaughter shackle;

said offset direction of the lower portion of the slaughter shackle extending towards the path of motion of the leg catching device.

20. A slaughter shackle for engaging, suspending and transporting in a conveying direction live poultry by their legs comprising:

an upper, conveyor engaging portion lying generally in a plane extending transversely perpendicular to a conveying direction;

a lower portion defining a pair of upwardly opening and downwardly closed slots, said lower portion and slots being offset from said plane in a direction of conveying of the poultry; said slots being transversely spaced relative to the conveying direction.

* * * * *